(No Model.)
L. HABECK.
POTATO DIGGER.
No. 292,804. Patented Feb. 5, 1884.
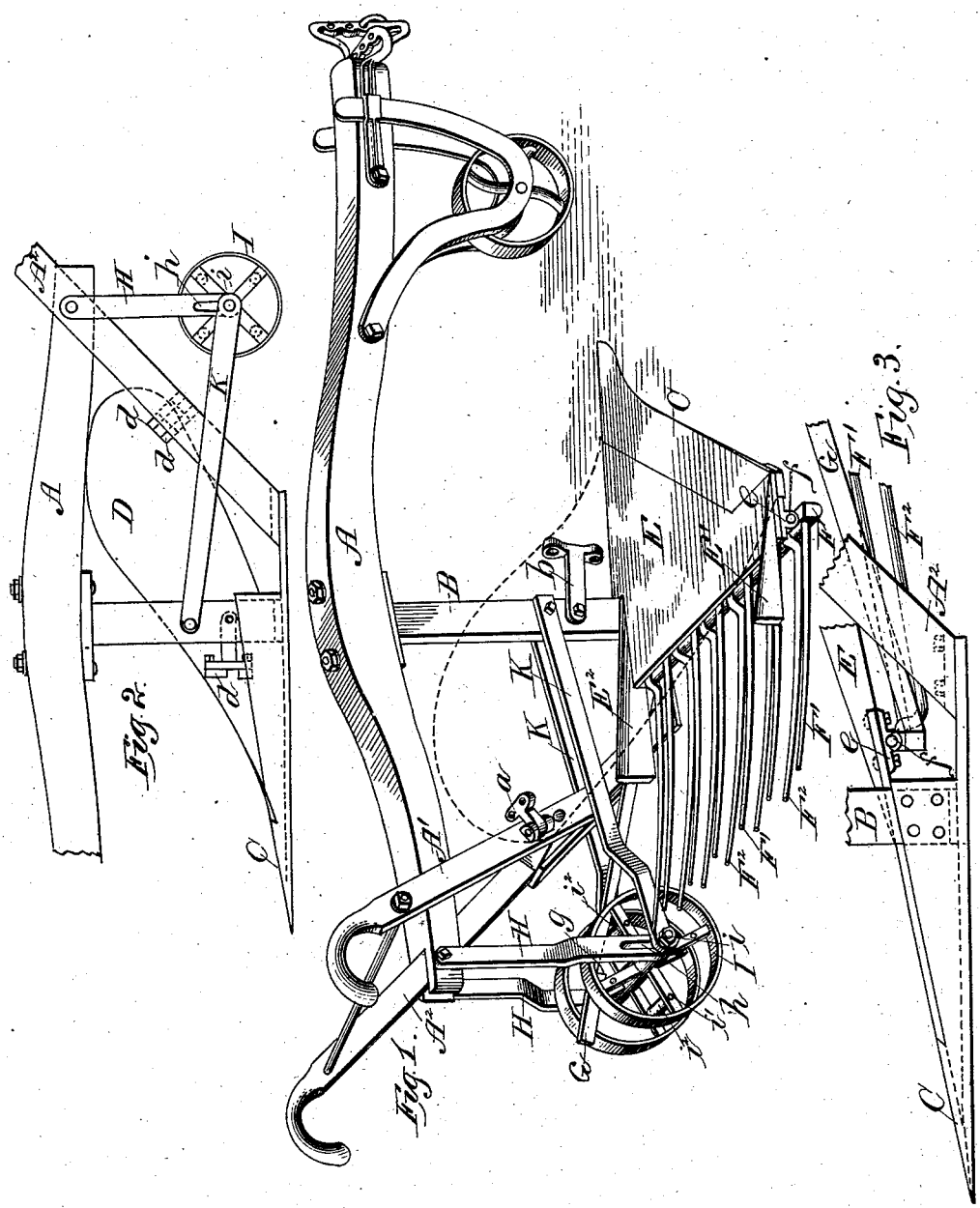
Witnesses:
E. J. Asmus
Adolph Klein
Inventor:
Ludwig Habeck
By
Stout & Underwood,
Attorneys.

UNITED STATES PATENT OFFICE.

LUDWIG HABECK, OF TOWN LAKE, WISCONSIN.

POTATO-DIGGER.

SPECIFICATION forming part of Letters Patent No. 292,804, dated February 5, 1884.

Application filed March 1, 1883. (No model.)

*To all whom it may concern:*

Be it known that I, LUDWIG HABECK, of Town Lake, in the county of Milwaukee, and in the State of Wisconsin, have invented certain new and useful Improvements in Plows, Cultivators, and Potato-Diggers; and I do hereby declare that the following is a full, clear, and exact description thereof.

My invention relates, generally, to the class of plows and cultivators; and it consists, essentially, in a machine which is adapted for use as a potato-digger, as will be more fully set forth hereinafter.

In the drawings, Figure 1 is a perspective view of my device adapted for use as a potato-digger. Fig. 2 is a side elevation of the device used as a plow, and Fig. 3 is a detail.

A represents a plow-beam, of ordinary construction, and $A'$ $A^2$ are the handles of the same.

B is the post, which supports the base of the plowshare C.

D is the removable mold-board, attachable as hereinafter explained.

E is a platform whose front edges coincide with the rear edges of the plowshare proper when the mold-board is not used.

F is a shaking-bar, whose journals $f$ are pivoted in bearings $e$ on the under side of the platform E, and which turn loosely therein. To this bar are secured the prongs $F'$ $F^2$, the prongs $F^2$ being bent down and then back, so as to occupy a plane lower than that of the prongs $F'$, and being arranged alternately therewith, as shown.

$E'$ $E^2$ are guards secured to the upper rear edges of the sides of the platform E.

G is a rod secured to the end of the shaking-bar F nearest the guard $E^2$, and this rod is notched or cut away at $g$, for a purpose to be described further on.

H H are two bent arms depending from the rear end of the beam A, and which are provided with slots $h$ in their lower portions, which slots serve as the bearings of the axle $i$ of a double wheel, I, while outside of these slots the said axle is connected to other rods, K K, which in turn are pivoted to the post B. The spokes of these wheels are connected by cross-rods $i'$ near the rims, and on these rods are sleeves $i^2$, and the rod G, already described, rests always on one of these sleeves.

When it is desired to use my device as a potato-digger, the platform E (with its attachments already described) is securely bolted to the base of the plow, being attached from the under side of said platform; but when it is desired to use the device as a plow the part E is unscrewed and removed and the mold-board D takes its place, as indicated in dotted lines in Fig. 1 and full lines in Fig. 2. Ears $d$ $d$ are cast on the back of the mold-board, and these are bolted to the eye-brackets $a$ and $b$, which are secured, respectively, to the handle $A'$ and post B.

The operation of my device when thus put together as a plow is too obvious to require description; but I wish to call attention to the slots $h$ in the arms H, by means of which (no matter whether my device is used as a plow or a potato-digger) I can raise the front end of the beam and point of the share C by simply bearing down upon the handles whenever I desire to free the said share so as to turn around.

When I desire to dig potatoes and have adjusted the device as shown in Fig. 1, the point of the share will enter the base of the potato-hills and carry the potatoes, as well as the earth about them, onto the platform E. As the device moves forward the guards $E'$ $E^2$ will prevent the potatoes from falling off and guide them upon the prongs $F'$ $F^2$. Now, as the wheel I revolves, the sleeves $i^2$ pass under the solid end of the rod G into the notched part $g$, which lowers the said rod with a sudden jerk, and then the next sleeve comes in contact with the said solid end, raising the rod again, and as this sleeve in turn passes under the notched portion the rod G drops, and this is continued, producing a tappet-like motion, which is communicated to the shaking-bar F, (to which the rod G is secured, as stated,) and from that to the prongs $F'$ $F^2$, thus constantly agitating the potatoes carried thereon and completely freeing them from the earth in which they were embedded.

Having thus described my invention, what I claim as new, and desire to secure by Letters Patent, is—

In combination with the beam, post, base, and plowshare, the wheel I, with sleeves $i^2$, braces H and K, platform E, shaking-bar F, with prongs F' F², and rod G, with notch $g$, all substantially as set forth.

In testimony that I claim the foregoing I have hereunto set my hand, on this 15th day of December, 1882, in the presence of two witnesses.

LUDWIG HABECK.

Witnesses:
E. G. ASMUS,
ADOLPH KLEIN.